United States Patent
Begeja et al.

(10) Patent No.: US 8,255,408 B1
(45) Date of Patent: Aug. 28, 2012

(54) SYSTEM AND METHOD FOR CATEGORIZING LONG DOCUMENTS

(75) Inventors: Lee Begeja, Gillette, NJ (US); David Crawford Gibbon, Lincroft, NJ (US); Zhu Liu, Marlboro, NJ (US); Bernard S. Renger, New Providence, NJ (US); Behzad Shahraray, Freehold, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 983 days.

(21) Appl. No.: 11/213,111

(22) Filed: Aug. 26, 2005

(51) Int. Cl.
*G06F 7/00* (2006.01)
*G06F 17/30* (2006.01)

(52) U.S. Cl. ......... 707/758; 707/736; 707/748; 707/749

(58) Field of Classification Search .................. None
See application file for complete search history.

(56) References Cited

U.S. PATENT DOCUMENTS

| | | | | |
|---|---|---|---|---|
| 5,446,874 A | * | 8/1995 | Waclawsky et al. | 714/1 |
| 5,857,179 A | * | 1/1999 | Vaithyanathan et al. | 707/2 |
| 5,895,470 A | * | 4/1999 | Pirolli et al. | 707/102 |
| 5,974,457 A | * | 10/1999 | Waclawsky et al. | 709/224 |
| 6,678,694 B1 | * | 1/2004 | Zimmermann et al. | 707/102 |
| 6,714,909 B1 | * | 3/2004 | Gibbon et al. | 707/102 |
| 6,912,536 B1 | * | 6/2005 | Ochitani | 707/737 |
| 7,526,462 B2 | * | 4/2009 | Sakurai et al. | 707/999.006 |
| 2002/0107712 A1 | * | 8/2002 | Lam et al. | 705/8 |
| 2002/0169764 A1 | * | 11/2002 | Kincaid et al. | 707/3 |
| 2003/0004966 A1 | * | 1/2003 | Bolle et al. | 707/104.1 |
| 2003/0208485 A1 | * | 11/2003 | Castellanos | 707/5 |

* cited by examiner

*Primary Examiner* — Fred I Ehichioya
*Assistant Examiner* — Garrett Smith

(57) ABSTRACT

A system, a method, an apparatus, and a computer-readable medium are provided. Each of a group of documents is segmented. Categories are assigned to each segment of the group of documents. A categorization series for each one of the group of documents is formed, based at least in part, on the categories assigned to each of the segments of respective ones of the plurality of documents. A pattern is found based, at least in part, on the plurality of categorization series corresponding to the plurality of documents. Each of the group of documents is categorized based, at least in part, on the pattern.

12 Claims, 2 Drawing Sheets

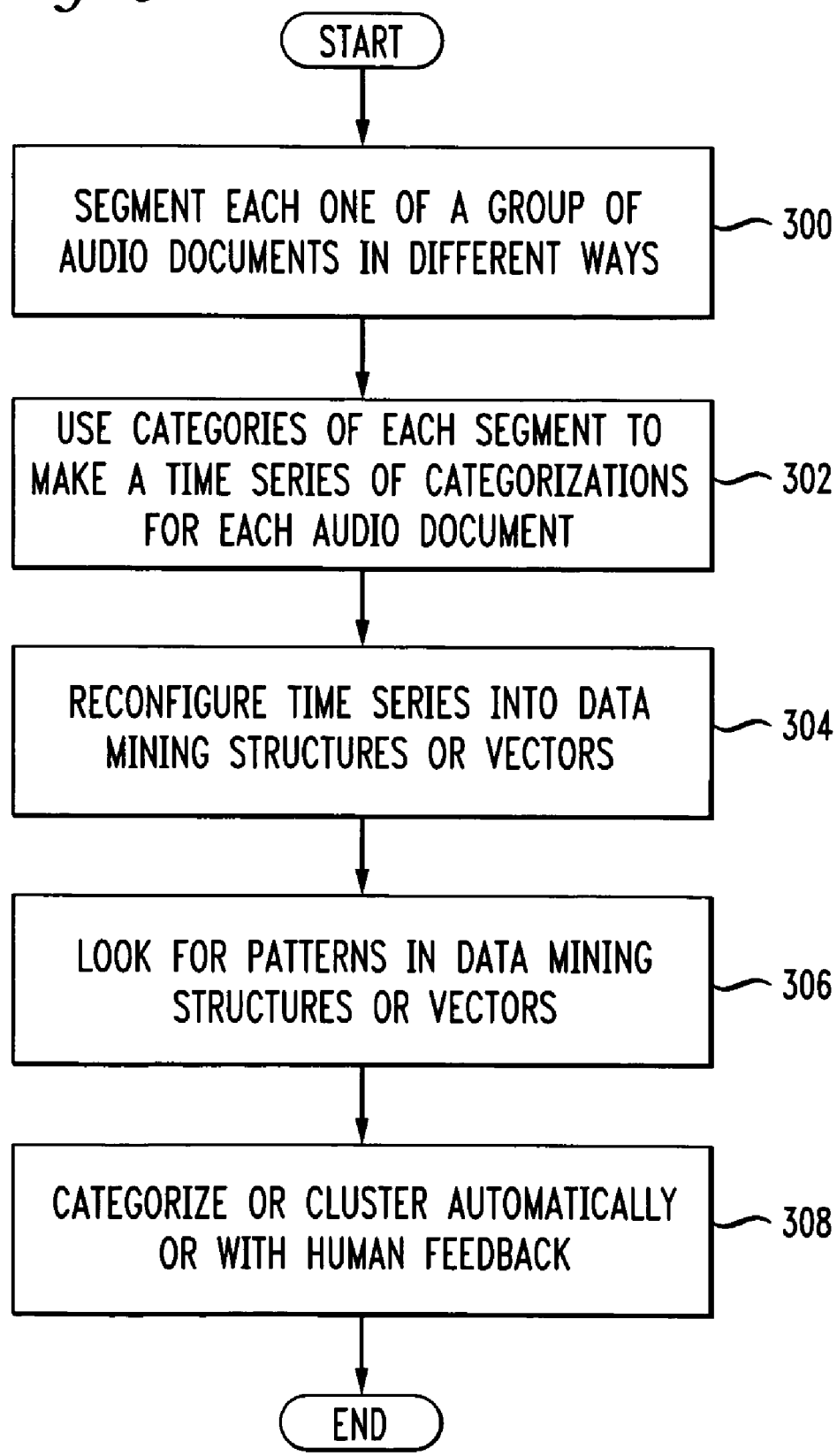

SYSTEM AND METHOD FOR CATEGORIZING LONG DOCUMENTS

BACKGROUND OF THE INVENTION

1. Field of the Invention

The present invention relates to categorizing long documents and more specifically to a system and method for categorizing long audio, audio/video or text documents.

2. Introduction

Existing speech recognition systems can receive speech as input and can label an utterance from the speech input based on words or groupings of words in the utterance. The labeling may be used to determine a proper response or action based on the utterance.

Searching, indexing, analyzing and data mining of large documents, such as, for example, audio, audio/video, or text documents is much more difficult than labeling a speech utterance which may include a small grouping of words. Consequently, searching, indexing, analyzing, and data mining operations performed on long documents may be quite time consuming. For example, if one wishes to find an audio document that includes a discussion among three participants, one may listen to a number of audio documents to determine whether any of the documents include a three-participant discussion in which each speaker participates about the same amount of time as other participants. This may take a substantial amount of time and, if the number of documents to analyze is large, the amount of time required to search for documents that satisfy a particular criteria may grow proportionately. Thus, a need exists for labeling or categorizing long documents to make the searching, indexing, analyzing and data mining operations of the large documents easier and less time consuming.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

In a first aspect of the invention, a method for categorizing documents is provided. Each of a group of documents is segmented. Categories are assigned to each segment of the group of documents. A categorization series for each one of the group of documents is formed, based at least in part, on the categories assigned to each of the segments of respective ones of the plurality of documents. A pattern is found based, at least in part, on the plurality of categorization series corresponding to the plurality of documents. Each of the group of documents is categorized based, at least in part, on the pattern.

In a second aspect of the invention, a machine-readable medium is provided that has recorded thereon instructions for at least one processor. The machine-readable medium includes instructions for segmenting each of a group of documents, instructions for assigning categories to each segment of the group of documents, instructions for forming a categorization series for each one of the group of documents based, at least in part, on the categories assigned to each of the segments of respective ones of the plurality of documents, instructions for finding a pattern based, at least in part, on the plurality of categorization series corresponding to the plurality of documents, and instructions for categorizing each of the group of documents based, at least in part, on the pattern.

In a third aspect of the invention, an apparatus is provided. The apparatus includes at least one processor, storage for data and instructions for the at least one processor, and a communication medium connecting the at least one processor and the storage. The apparatus is configured to segment each of a group of documents, assign categories to each segment of the plurality of documents, form a categorization series for each one of the plurality of documents based, at least in part, on the categories assigned to each of the segments of respective ones of the plurality of documents, find a pattern based, at least in part, on the plurality of categorization series corresponding to the plurality of documents, and categorize each of the group of documents based, at least in part, on the pattern.

In a fourth aspect of the invention, an apparatus is provided. The apparatus includes means for segmenting each of a group of documents, means for assigning categories to each segment of the plurality of documents, means for forming a categorization series for each one of the plurality of documents based, at least in part, on the categories assigned to each of the segments of respective ones of the plurality of documents, means for finding a pattern based, at least in part, on the plurality of categorization series corresponding to the plurality of documents, and means for categorizing each of the group of documents based, at least in part, on the pattern.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 illustrates a flowchart of an exemplary process that may be performed in implementations consistent with the principles of the invention.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Exemplary System

Figure 1:
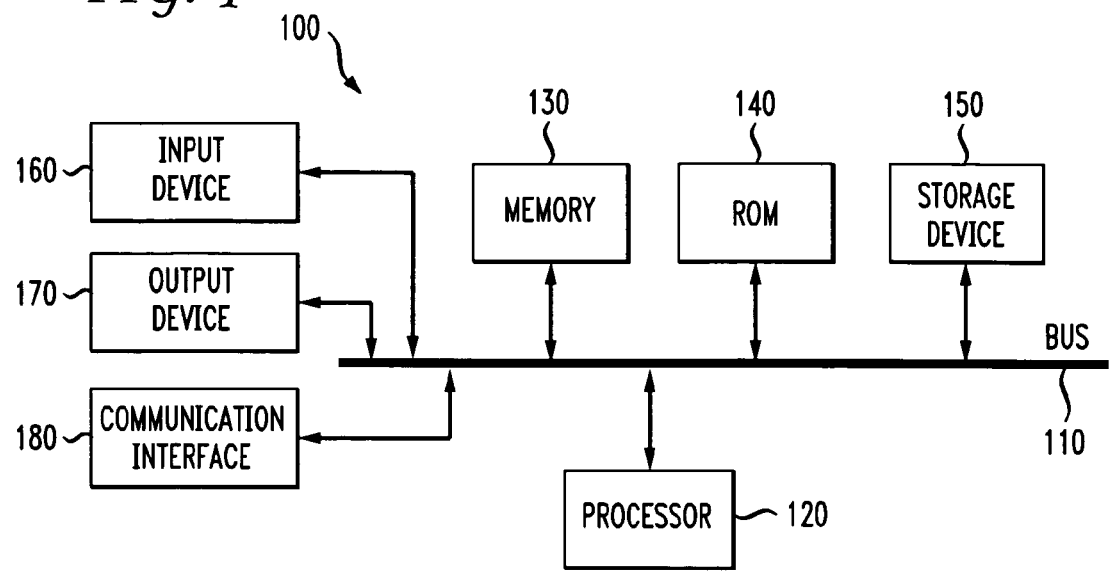
FIG. 1 illustrates an exemplary system in which implementations consistent with the principles of the invention may operate.

FIG. 1 illustrates a block diagram of an exemplary processing device 100 which may be used to implement systems and methods consistent with the principles of the invention. Processing device 100 may include a bus 110, a processor 120, a memory 130, a read only memory (ROM) 140, a storage device 150, an input device 160, an output device 170, and a communication interface 180. Bus 110 may permit communication among the components of processing device 100.

Processor 120 may include at least one conventional processor or microprocessor that interprets and executes instructions. Memory 130 may be a random access memory (RAM) or another type of dynamic storage device that stores information and instructions for execution by processor 120. Memory 130 may also store temporary variables or other intermediate information used during execution of instructions by processor 120. ROM 140 may include a conventional ROM device or another type of static storage device that stores static information and instructions for processor 120. Storage device 150 may include any type of media, such as, for example, magnetic or optical recording media and its corresponding drive. In some implementations consistent with the principles of the invention, storage device 150 may store and retrieve data according to a database management system.

Input device 160 may include one or more conventional mechanisms that permit a user to input information to system 200, such as a keyboard, a mouse, a pen, a voice recognition device, a microphone, a headset, etc. Output device 170 may include one or more conventional mechanisms that output information to the user, including a display, a printer, one or more speakers, a headset, or a medium, such as a memory, or a magnetic or optical disk and a corresponding disk drive. Communication interface 180 may include any transceiver-like mechanism that enables processing device 100 to communicate via a network. For example, communication interface 180 may include a modem, or an Ethernet interface for communicating via a local area network (LAN). Alternatively, communication interface 180 may include other mechanisms for communicating with other devices and/or systems via wired, wireless or optical connections.

Processing device 100 may perform such functions in response to processor 120 executing sequences of instructions contained in a computer-readable medium, such as, for example, memory 130, a magnetic disk, or an optical disk. Such instructions may be read into memory 130 from another computer-readable medium, such as storage device 150, or from a separate device via communication interface 180.

Processing device 100 may be, for example, a personal computer (PC), or any other type of processing device capable of creating and sending messages. In alternative implementations, such as, for example, a distributed processing implementation, a group of processing devices 100 may communicate with one another via a network such that various processors may perform operations pertaining to different aspects of the particular implementation.

Overview

Documents may be static, such as, for example a book, or they may be dynamic, such as, for example, a web stream, an audio or video broadcast or a time series view of characteristics of a network. Thus, documents may include computer programs, virus definitions, television programs and network characteristics. Network characteristics are defined as any time series view of network properties such as, for example, a flow, Internet Protocol (IP) addresses, routing, number of bytes, ratio of commands to data (e.g., many Transmission Control Protocol (TCP) SYN commands with little or no data could imply a problem). Network characteristics may then be thought of as a dynamic document that is continually growing or changing in time. This concept of treating network characteristics as a type of document that can be categorized and searched has applications to many fields that affect network security and assurance.

Understanding and categorizing dynamic documents is a complex problem. In order to simplify the problem, dynamic documents may be treated as static documents that may be segmented as more information arrives as time passes. Thus, the remainder of the specification does not differentiate between static and dynamic documents. However, the details in the remainder of the specification may apply to both dynamic and static documents.

Static documents, such as, for example, audio documents, audio/video documents, and textual documents may be categorized based on metadata included within the document or derived from data within the document. For the following example assume that audio documents are to be categorized. The documents may be segmented according to derived metadata. For example, using included or derived metadata, an exemplary audio document may be segmented into a speaker segment, a speech segment, a noise segment, a music segment, a silent segment, a loud segment, a quiet segment, as well as other types of segments.

A time series may then be generated from each document based on the segments of the documents with the knowledge that segments may and often do overlap in time. For example, a time series for an audio document may be generated indicating that the audio document has, first, a 20 minute speaker segment, second, a 15 minute music segment, and, third, a 10 minute loud segment. Alternatively, the time series may describe the percentage of the document used for each segment. For example, the exemplary audio document may have a time series of 44% speaker segment, 33% music segment, and 22% loud segment.

Figure 2A:
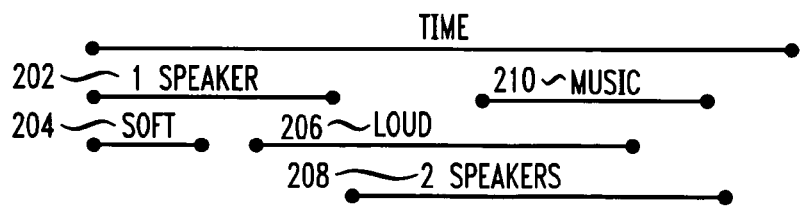
FIGS. 2A and 2B show exemplary methods for segmenting an audio document and a network characteristics document, respectively.

FIG. 2A illustrates an exemplary time series of an audio document. Time is represented in a horizontal direction, with time passing as one moves to the right in FIG. 2A. As shown in the exemplary time series, segments 202 and 204 indicate, respectively, that, at the beginning of the audio document, one speaker is talking and the sound level is soft. At a later point in the document, the sound is no longer considered soft or loud, while the one speaker is talking. This is indicated by the gap between segments 204 and segment 206, at a point when segment 202 continues without any gap. Later, segment 206 indicates that the sound level is loud. During the time that the sound level is loud, the end of segment 202 and the beginning of segment 208 indicate that the one-speaker portion of the document ends and a two-speaker portion of the document begins. Segment 210 indicates that, at some point during the two-speaker portion of the document, the document includes music that ends at a point near the end of the two-speaker portion of the document.

Figure 2B:
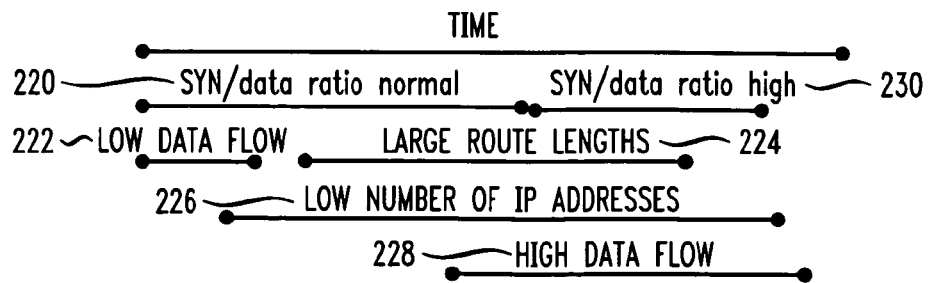

FIG. 2B illustrates an exemplary time series of a network characteristics document. Time is represented in the same manner as in FIG. 2A. As shown in the exemplary time series, segment 220 indicates a normal SYN/data ratio. During the time that the SYN/data ratio is normal, segment 222 indicates a low data flow for a portion of time that coincides with the beginning of the time period when the SYN/data ratio is normal. Near the end of the low data flow time period, segment 226 indicates a beginning of a time period during which the network characteristics indicate a low number of IP addresses. Segment 224 indicates that the network characteristics include large route lengths beginning at a point in time after the end of a low data flow period, but during a time in which the network characteristics indicate a low number of IP addresses and during a time in which the network characteristics indicate a normal SYN/data ratio. Segment 228 indicates that high data flow occurs about midway through the time period in which a low number of IP addresses and large route lengths occur. Segment 230 indicates that a high SYN/data ratio occurs near the beginning of a second half of the time period in which a low number of IP addresses occurs and during a time period of high data flow.

Next, in an implementation consistent with the principles of the invention, a multidimensional vector may be generated for each of the documents based on the generated time series. Each of the dimensions of the vector may represent metadata derived from the documents. For example, the dimensions of each of the vectors may represent number of speakers, language, and length of document. Other implementations consistent with the principles of the invention may represent other metadata as dimensions for vectors. The choice of what metadata to use for the dimensions of the vector may be provided by a human or may be automatically selected based on the metadata derived from a group of documents. In yet other implementations consistent with the principles of the invention, methods other than multidimensional vectors may be used.

Next, implementations consistent with the principles of the invention may search for patterns in the data mining structures or vectors. Using the exemplary vectors having number of speakers, language, and length of document, an exemplary implementation may note that a number of documents have particular characteristics.

Information may be presented to a user indicating characteristics of the documents based on the vectors. Assume, for this example, that the information presented indicates that 30% of the exemplary audio documents have only one speaker speaking for at least 33% of the length of the documents, 40% of the documents have two speakers and, of the documents having two speakers, no one speaker speaks less than 20% of the amount of time of the other speaker, and 27% of the documents have more than two speakers. The user may provide input indicating, for example, that the user wishes to find more documents with characteristics that are similar to other documents, or the user may provide input indicating that the user is interested in finding documents having specific characteristics or that fall within a range of characteristics. Further, implementations consistent with the principles of the invention may permit the user to enter specific characteristics or a range of characteristics and one or more categories to assign to documents based on the documents satisfying the entered characteristics or range of characteristics.

Next, implementations consistent with the principles of the invention may categorize the documents automatically or based on the input from the user. Further implementations may automatically cluster the documents based, at least in part, on the multidimensional vectors. Clustering may be performed using any well-known clustering techniques, such as, for example, dot products of vectors to determine closeness of the audio documents, or bottom-up clustering to develop tree-structured cluster hierarchies, or other techniques.

Although the above example refers to using implementations of the invention with audio documents, implementations consistent with the principles of the invention are not limited only to audio documents. For example, implementations consistent with the principles of the invention may analyze and categorize or cluster audio/video documents, textual documents, or network characteristics documents, as well as other types of documents.

Exemplary Processing

FIG. 3 illustrates a flowchart of an exemplary process that may be performed in implementations consistent with the principles of the invention. For the ease of explanation, the exemplary process assumes that the documents to be analyzed are audio documents. However, embodiments of the invention are not limited to working with only audio files, but may also work with other types of files, as previously mentioned.

The process may begin by segmenting each document of a group of audio documents in various ways (act 300). For example, metadata may be included in a document or may be derived from information in the document and the document may be segmented using the derived or included metadata. For example, using derived metadata, an exemplary audio document may be segmented into a speaker segment, a speech segment, a noise segment, a music segment, a silent segment, a loud segment, a quiet segment, an emotional segment, an English language segment, a Spanish language segment, a non-speech segment, as well as other types of segments, based on contents of the document.

Categories applied to each segment of an audio document may be used to make a time series of categorizations for each audio document (act 302). For example, an exemplary time series corresponding to a particular audio document may describe the audio document as having, first, a 20 minute speaker segment, second, a 15 minute music segment, and, third, a 10 minute loud segment. Alternatively, the time series may describe the percentage of the document used for each segment. For example, the exemplary audio document may have a time series of 44% speaker segment, 33% music segment, and 22% loud segment. In some implementations consistent with the principles of the invention, a length of the document may be derived from time stamp information included in the document.

The time series for each audio document may be reconfigured into any type of data mining structure such as, for example, a multidimensional vector (act 304). For example, after analyzing the time series corresponding to a number of documents, a multi-dimensional vector may be configured based on the time series, such that each dimension of the vectors corresponds to metadata and the corresponding dimensions of all documents to be analyzed together may be identical. For example, for the above-mentioned exemplary audio document, a vector such as, for example, a three-dimensional vector, may be configured as having dimensions corresponding to speaker length, music length, and loud length with respective values of 20 minute speaker, 15 minute music, and 10 minute loud, or, using the above alternate example, values of 44% speaker, 33% music, and 22% loud.

Next, patterns in the data mining structures or vectors corresponding to the audio documents may be observed (act 306). For example, patterns in the vectors may be observed such as, for example, 3 speakers talking, where each speaker speaks approximately the same amount of time, or patterns in which multiple speakers speak, but one speaker speaks about 90% of the time, or other types of patterns.

Next, the audio documents may be categorized or clustered automatically or based, at least partly, on human feedback (act 308). For example, vectors corresponding to audio documents may be clustered using well-known techniques or other techniques, as discussed previously. Implementations consistent with the principles of the invention may automatically categorize one or more audio documents and the categories may encompass the sets of categories created in the data mining structures or vectors. For example, one or more audio documents may be categorized as lectures; other audio documents may be categorized as discussions, etc.

Further, a human may provide feedback for defining clusters or categories. For example, a human may indicate an interest in audio documents that have multiple speakers and at least some music. Thus, providing at least one suggested category for categorization of documents. In other implementations consistent with the principles of the invention, a human may provide relevance feedback to indicate portions of audio documents that are of interest. Thus, relevant portions of a document may receive more weight than other portions of the document. In addition, a human may provide input indicating a desire to find documents similar to another document. In implementations consistent with the principles of the invention, similar documents may be determined as a result of clustering.

Other Document Types

Although the above examples focus on audio document, implementations consistent with the principles of the invention are not limited to only audio documents. For example, implementations may also be used with audio/video documents or text documents. In one implementation, the audio portion of an audio/video document may be categorized in the manner described with reference to the flowchart of FIG. 3. In another implementation, textual documents may be categorized according to the exemplary process of the flowchart of FIG. 3. However, with respect to textual documents, metadata, such as for example, number of speakers, may be determined, for example, by the use of grammar, vocabulary, or by a certain pattern of grammatical errors, such as, for example, lack of agreement between subject and verb, use of wrong tense, use of slang language, etc. Thus, the concept of document types may include computer programs, including viruses or any type of programmable interface, and any documents and interfaces that can be represented by text or symbols including, but not limited to, music and choreography charts. Network characteristics may also be considered to be a document type and alerts could be given or searches may be performed for network anomalies including, but not limited to, denial of service attacks or attacks by viruses or worms.

Conclusion

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media. A tangible computer-readable medium excludes a wireless interface and signals per se.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, hardwired logic may be used in implementations instead of processors, or one or more application specific integrated circuits (ASICs) may be used in implementations consistent with the principles of the invention. Further, implementations consistent with the principles of the invention may have more or fewer acts than as described, or may implement acts in a different order than as shown. Accordingly, the appended claims and their legal equivalents should only define the invention, rather than any specific examples given.

We claim as our invention:

1. A method comprising:
   segmenting each of a plurality of documents based on metadata associated with the plurality of documents to yield respective segments;
   forming a time series for each one of the plurality of documents based, at least in part, on the respective segments, the time series comprising a plurality of overlapping time lines, wherein each time line represents at least one period of time associated with a characteristic exhibited by a respective document from the plurality of documents;
   generating a multidimensional vector based on the time series, wherein each dimension in the multidimensional vector represents metadata associated with the plurality of documents;
   finding a pattern based, at least in part, on the multidimensional vector; and
   classifying each of the plurality of documents based, at least in part, on the pattern.

2. The method of claim 1, further comprising:
   reconfiguring the time series into a structure; and
   finding the pattern in the structure.

3. The method of claim 2, further comprising:
   clustering the plurality of documents based, at least in part, on information associated with the structure.

4. The method of claim 1, wherein classifying each of the plurality of documents further comprises:
   obtaining human feedback; and categorizing each of the plurality of documents based, at least in part, on the human feedback.

5. A non-transitory computer-readable storage medium having stored therein instructions which, when executed by a processor, cause the processor to perform a method comprising:

segmenting each of a plurality of documents based on metadata associated with the plurality of documents to yield respective segments;

forming a time series for each one of the plurality of documents based, at least in part, on the respective segments, the time series comprising a plurality of overlapping time lines, wherein each time line represents at least one period of time associated with a characteristic exhibited by a respective document from the plurality of documents;

generating a multidimensional vector based on the time series, wherein each dimension in the multidimensional vector represents metadata associated with the plurality of documents;

finding a pattern based, at least in part, on the multidimensional vector; and classifying each of the plurality of documents based, at least in part, on the pattern.

6. The non-transitory computer-readable storage medium of claim 5, the instructions, which when executed by a processor, cause the processor to perform a method further comprising:

reconfiguring the time series into a structure; and
finding the pattern in the structure.

7. The non-transitory computer-readable storage medium of claim 6, the instructions, which when executed by a processor, cause the processor to perform a method further comprising:

clustering the plurality of documents based, at least in part, on information included in the structure.

8. The non-transitory computer-readable storage medium of claim 5, the instructions, which when executed by a processor, cause the processor to perform a method further comprising:

obtaining human feedback; and
categorizing each of the plurality of documents based, at least in part, on the human feedback.

9. A system comprising:
a processor; and
a computer-readable storage medium having stored therein instructions which, when executed by the processor, cause the processor to perform a method comprising:

segmenting each of a plurality of documents based on metadata associated with the plurality of documents to yield respective segments;

forming a time series for each one of the plurality of documents based, at least in part, on the respective segments, the time series comprising a plurality of overlapping time lines, wherein each time line represents at least one period of time associated with a characteristic exhibited by a respective document from the plurality of documents;

generating a multidimensional vector based on the time series, wherein each dimension in the multidimensional vector represents metadata associated with the plurality of documents;

finding a pattern based, at least in part, on the multidimensional vector; and classifying each of the plurality of documents based, at least in part, on the pattern.

10. The system of claim 9, the computer-readable storage medium storing further instructions which, when executed by the processor, cause the processor to perform a method further comprising:

reconfiguring of the time series into a structure; and
finding the pattern in the structure.

11. The system of claim 10, the computer-readable storage medium storing further instructions which, when executed by the processor, cause the processor to perform a method further comprising:

clustering the plurality of documents based, at least in part, on information included in the structure.

12. The system of claim 9, the computer-readable storage medium storing further instructions which, when executed by the processor, cause the processor to perform a method further comprising:

obtaining human feedback; and
categorizing each of the plurality of documents based, at least in part, on the human feedback.

* * * * *